May 6, 1952     R. WAHLBECK     2,596,083
SYRINGE
Filed May 13, 1949
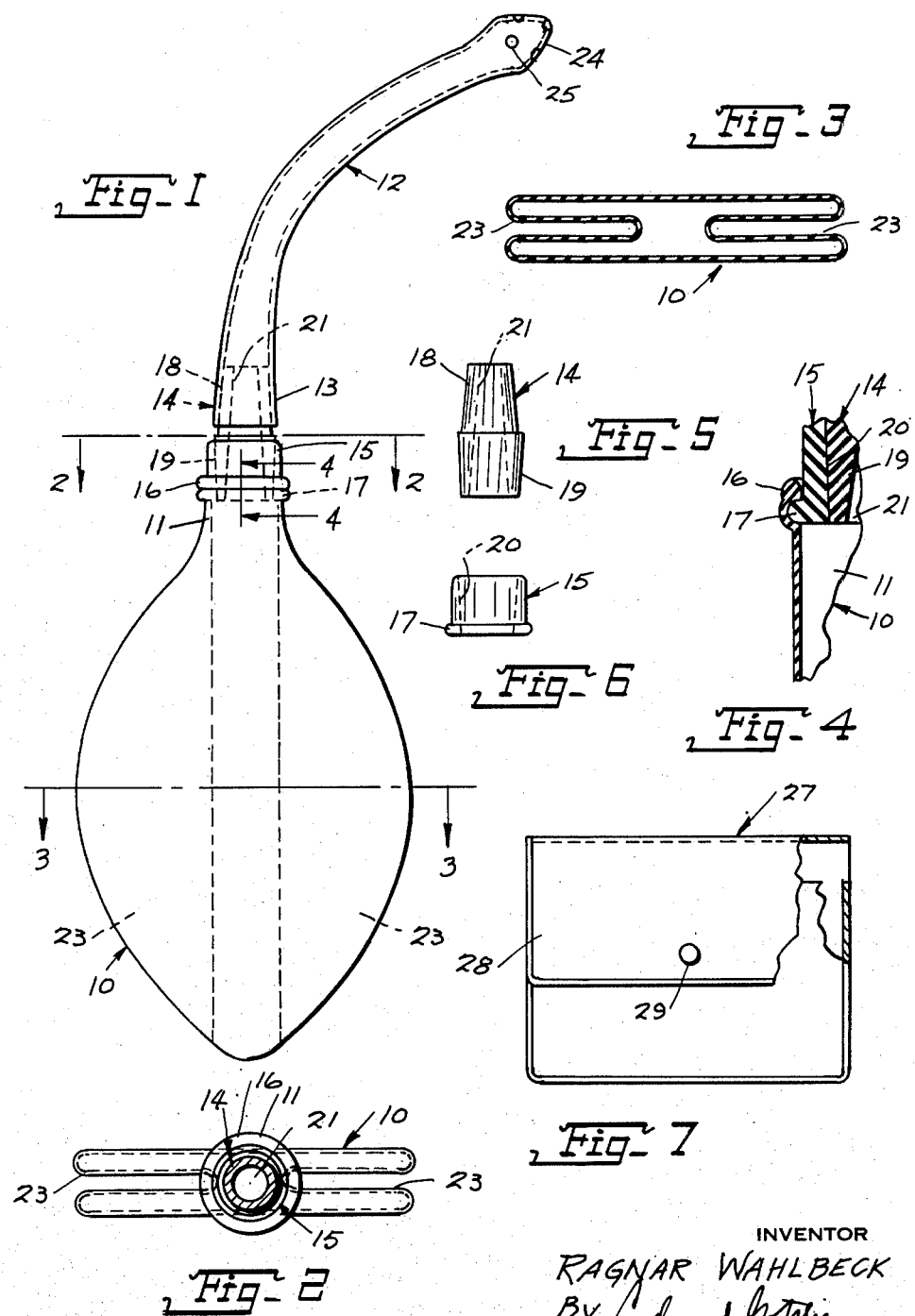
INVENTOR
RAGNAR WAHLBECK
ATTORNEY Patented May 6, 1952

2,596,083

UNITED STATES PATENT OFFICE 2,596,083

SYRINGE

Ragnar Wahlbeck, New York, N. Y.

Application May 13, 1949, Serial No. 93,091

1 Claim. (Cl. 128—231)

This invention relates to new and useful improvements in catheters.

The dominating object of this invention is the construction of a catheter which may be folded to a very small size so that it may be carried in a small container.

More particularly, it is proposed to characterize the new catheter by a normally flat, soft rubber bag having a neck portion, a soft rubber nozzle of thicker rubber than said bag and having an inlet end portion, and a pair of connectors for connecting said bag and nozzle together.

It is proposed that one of the connectors be tightly mounted in the neck portion of the rubber bag and the other connector tightly mounted in the inlet end portion of the nozzle in order that the nozzle may be connected with said bag and disconnected from said bag merely by connecting and disconnecting said pair of connectors.

This invention contemplates that said rubber bag be made from thin rubber, preferably by dipping. It is also proposed that the neck portion be provided with a beaded edge for more securely engaging and holding said connector. It is also proposed that said connector be provided with a beaded portion engaging beneath said beaded edge in order to securely hold these parts together.

The invention also contemplates to construct the connectors with tapered portions which may be forced together for inexpensively providing efficient connectors for the catheter.

Preferably, the soft rubber bag is provided with folded side portions which may be opened when said bag is opened in order to increase the capacity of the bag.

The invention also contemplates the provision of a small waterproof flexible case into which said nozzle and bag may be engaged when disconnected from each other and folded.

Another object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is an elevational view of a catheter constructed in accordance with this invention.

Fig. 2 is a horizontal sectional view taken on the line 2—2 of Fig. 1.

Fig. 3 is a horizontal sectional view taken on the line 3—3 of Fig. 1.

Fig. 4 is a fragmentary enlarged vertical sectional view taken on the line 4—4 of Fig. 1.

Fig. 5 is an elevational view of one of the connectors used in the catheter, but illustrated per se.

Fig. 6 is an elevational view of another connector.

Fig. 7 is an elevational view of the flexible case for the catheter, portions thereof being broken away to disclose the interior construction.

The catheter, in accordance with this invention, includes a normally flat soft rubber bag 10 having a neck portion 11. A soft rubber nozzle 12 of thicker rubber than said bag 10 is provided with an inlet end portion 13. A pair of connectors 14 and 15, adapted to be connected with each other and disconnected from each other, is associated with said bag 10 and nozzle 12. More particularly, the connector 15 is tightly mounted in the neck portion 11 and the connector 14 is tightly mounted in the inlet end portion 13 in order that said nozzle 12 may be connected with said bag 10 and disconnected from said bag 10 merely by connecting and disconnecting said pair of connectors 14 and 15.

The neck portion 11 is provided with a beaded edge 16. The connector 15 is provided with a complementary beaded portion 17 adapted to engage beneath the beaded edge 16 in order to securely hold these parts together, see particularly Fig. 4. The connector 14 is provided with a tapered end portion 18 adapted to tightly engage into the inlet end portion 13 of the nozzle 12. The connector 14 is also provided with a tapered end portion 19 engageable in a complementary tapered opening 20 formed in the connector 15. A passage 21 engages through the connector 14 through which liquid may flow.

The bag 10 is provided with folded side portions 23 which may be opened when said bag is opened in order to increase the capacity of the bag. The outer end of the nozzle 12 is provided with a tip portion 24 having orifices 25.

A small waterproof flexible case 27 is provided into which the nozzle 12 and bag 10 may be engaged when they are disconnected from each other and folded into a small compass. This case 27 is provided with a flap cover 28 adapted to be held closed with a snap fastener 29.

The operation and use of the catheter may be understood from the following. In Fig. 1 the catheter is illustrated with the nozzle 12 mounted in position upon the bag 10. However, the bag 10 is illustrated empty and arranged with the folded side portions 23 folded inwards. The nozzle 12 may be removed merely by pulling it away from the bag 10 so that the connector 14 disengages from the connector 15 which maintains its position in the mouth of the bag 10. The bag 10 may be filled with suitable fluid which will open up the folds 23 so as to receive a maximum quantity of liquid. The nozzle 12 is then connected with the bag 10 merely by engaging the connector 14 with the connector 15. The catheter is used in the usual way.

When the catheter is not being used it may be stored in the case 27. This maybe done by first pulling off the nozzle 12 from the bag 10. The bag 10 may be suitably cleaned because of the large passage through the connector 15. The bag 10 may be folded or rolled into a small compass so as to fit into the case 27. The nozzle 12 is rolled or bent so as to also fit into the case 27.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

A catheter, comprising a normally flat soft rubber bag having a neck portion, a soft rubber nozzle of thicker rubber than said bag and having an inlet end portion, a pair of connectors, one of said connectors having a tapered projecting end portion and the other having a tapered socket portion for receiving and frictionally holding said projecting end portion, and one of said connectors being tightly mounted in said neck portion and the other being tightly mounted in said inlet end portion.

RAGNAR WAHLBECK.

REFERENCES CITED

The following references are of record in the file of this patent:

UNITED STATES PATENTS

| Number | Name | Date |
| --- | --- | --- |
| Re. 7,946 | Richardson | Nov. 13, 1877 |
| 43,158 | Shepard | June 14, 1864 |
| 94,029 | Puffer | Aug. 24, 1869 |
| 1,901,069 | Williams | Mar. 14, 1935 |
| 2,029,483 | Holland | Feb. 4, 1936 |
| 2,087,780 | Powell | July 20, 1937 |
| 2,410,367 | Shapiro | Oct. 29, 1946 |

OTHER REFERENCES

French patent to Ingram, III Series, vol. 27, c. 12, 8 p., 18 pl. 4, Oct. 11, 1878, No. 126,909.